Patented Feb. 18, 1936

2,031,546

UNITED STATES PATENT OFFICE 2,031,546

RESIST EFFECTS WITH AZO DYESTUFFS

Charles Schwabe Parker, Charles Leonard Wall, and Franklin Farrington, Bolton, England No Drawing. Application July 13, 1933, Serial No. 680,332. In Great Britain July 20, 1932

4 Claims. (Cl. 8—5)

This invention relates to improvements in dyeing with azo dyestuffs and has for its object to obtain new or improved resist effects.

It is known that the coupling of a hydroxy carboxylic acid arylide or similar passive component with a diazotized amine may be prevented by applying to a fabric, treated with the passive component, an agent capable of forming an inactive compound with one of the components, such as aluminium sulphate or sodium sulphite, and these are customarily employed in textile printing.

It is a drawback to this method that the goods treated with the passive component, which are in general deleteriously affected by storage, must be printed and developed within a comparatively short period of time. Moreover it is impracticable to apply many dyestuffs such as aniline black, Rapidogen and rapid fast colours, since the conditions required for the normal development of these classes of dyestuffs cannot be obtained on naphthol prepared goods. A further disadvantage is that many of the more substantial naphthols such as naphthol AS/BR (di-anisidide of beta-hydroxy naphthoic acid) and naphthol AS/LB (anilide of hydroxy-carbazole-carboxylic acid) are not completely removed by washing processes, and give rise to discolouration on exposure to the atmosphere and particularly to light, owing to the oxidation of residual naphthol in the resisted places.

One object of the invention is to produce fabrics, having the resist in selected areas, which may be stored indefinitely. Another object is to enable the more substantive naphthols, such as those indicated above, to be used with better effect. Another object is to produce resists in which membrane formation assists in resisting the dyes. Another object is to obtain resists giving sharper definition to the pattern. Another object is to enable the resisted fabrics to be dyed with aniline black, Rapidogen, rapid fast colours and the like dyestuffs which require conditions of dyeing not obtainable with naphthol prepared goods. These and other objects will be apparent from the following description and examples to which, however, the invention is not limited.

It has now been observed that by applying to the fabric, before treatment with the passive component, a resist containing or consisting essentially of an aluminium salt of an acid which does not cause tendering of the fabric, together with a thickening, it is possible to produce resist effects which may be stored indefinitely after printing, and may be combined with aniline black, Rapidogen or rapid fast dyestuffs for the production of multi-colour prints.

The aluminium salt of a weak acid and especially of an organic carboxylic acid is most suitably used. Aluminium formate or aluminium acetate are particularly suitable. The resist may contain auxiliary means for promoting the formation of a membrane, such as a manganese salt. Such membrane formation enhances the resist effect.

The expression "passive component" is used herein to indicate a compound adapted to be coupled with a diazo compound for the production of an azo dye and containing electro-negative groups whereby double decomposition of its alkali salt with an aluminium salt produces an insoluble complex.

In the preferred form of this process, a printing paste containing 25% aluminium acetate thickened with starch tragacanth, is employed.

It has been found of advantage in the execution of this resist style to make an addition to the printing paste of a quantity, usually 5%, of unswollen starch, together with a substance, preferably ammonium thiocyanate, which facilitates peptization of the starch by water during drying.

Thus, during printing the starch functions as a highly dispersed pigment preventing the spread of the printing paste and giving increased sharpness, whilst upon drying the outer layer of the starch becomes hydrated, thus assisting in the formation of a membrane denser than is otherwise obtainable.

Example 1

To a fabric of viscose is applied a resist of the following composition:—

25 grams aluminium formate.
5 grams manganese chloride crystals.
35 grams gum arabic thickening.
35 grams dark British gum thickening.

After printing with this resist the goods are padded in a solution containing:—

3% by weight naphthol AS/LB (anilide of hydroxy-carbazole-carboxylic acid).
1% by volume caustic soda (90° Tw.).
3% by weight trisodium phosphate.
2½% by weight oleine.
1% by weight soap.

The fabric is then dried and dyed in a solution containing:—

1% diazotized meta-nitro-ortho-toluidine.
1% aluminium sulphate.

The fabric is then thoroughly rinsed in ¼% sodium bisulphite solution, washed, rinsed in ¼% oxalic acid solution at 60° C., rinsed again, and boiled in soap and soda for a quarter of an hour.

A white resist is obtained under a fast brown shade.

Example 2

To a fabric of cotton is applied a resist of the following composition:—

| | Parts by weight |
|---|---|
| Wheat starch powder | 5 |
| Cold water | 5 |
| Aluminium acetate powder | 22½ |
| Starch tragacanth thickening | 92½ |
| Ammonium thiocyanate | 5 |

The starch and cold water are made into a paste and stirred into the aluminium acetate and thickening. The ammonium thiocyanate is then incorporated and the paste applied simultaneously with printing pastes of aniline black and Rapidogen scarlet prepared in the usual manner.

After printing the goods are aged in order to develop the aniline black, and subsequently passed through a chamber containing formic or acetic acid vapour in order to develop the Rapidogen colour, padded on a mangle in a solution containing, 1% by weight naphthol AS/G (ortho di-anisidide of aceto-acetic acid).

2½% by volume caustic soda 90° Tw.

2½% by weight oleine, dried and again padded in a solution containing,

1% fast yellow GC (hydrochloride of o-chloraniline), diazotized.

2% formic acid.

.125% nekal B extra, passed over rollers in the air until coupled, and subsequently passed through three becks containing respectively ¼% formic acid, ½% sodium bisulphite, ½% sodium bisulphite, rinsed in warm oxalic acid and finally washed in soap and caustic soda.

A design is obtained in white, black and scarlet upon a fast yellow ground.

We declare that what we claim is:—

1. In a process of dyeing, first applying to selected areas of a fabric a resist containing aluminium acetate, thickening, unswollen starch and a peptizer for said starch, then applying to the fabric a passive component and then treating the fabric with a diazo compound.

2. In a process of dyeing, first applying to selected areas of a fabric a resist containing aluminium acetate, thickening, unswollen starch and ammonium thiocyanate and then applying to the fabric a passive component.

3. In a process of dyeing, first applying to selected areas of a fabric a resist containing aluminium acetate, thickening and a manganese salt, then applying to the fabric a passive component and then treating the fabric with a diazo compound.

4. In a process of azo dyeing, first applying to selected areas of a fabric a resist containing aluminium formate, thickening and a manganese salt, then applying to the fabric a passive component, and then treating the fabric with a diazo compound.

CHARLES SCHWABE PARKER.
CHARLES LEONARD WALL.
FRANKLIN FARRINGTON.